United States Patent [19]
Hiereth et al.

[11] Patent Number: 5,406,796
[45] Date of Patent: Apr. 18, 1995

[54] EXHAUST GAS TURBOCHARGER FOR A SUPERCHARGED INTERNAL COMBUSTION ENGINE

[75] Inventors: Hermann Hiereth, Esslingen; Wolfgang Erdmann; Siegfried Sumser, both of Stuttgart, all of Germany

[73] Assignee: Mercedes-Benz AG, Stuttgart, Germany

[21] Appl. No.: 227,069

[22] Filed: Apr. 13, 1994

[30] Foreign Application Priority Data

Apr. 13, 1993 [DE] Germany .................. 43 120 78.4

[51] Int. Cl.⁶ .................................................. F02B 37/12
[52] U.S. Cl. ........................................ 60/605.2; 60/606
[58] Field of Search .......................... 60/605.2, 606

[56] References Cited

U.S. PATENT DOCUMENTS

| | | | |
|---|---|---|---|
| 2,877,622 | 3/1959 | Antonissen | 60/606 |
| 4,250,711 | 2/1981 | Zehnder | 60/605.2 |
| 4,367,626 | 1/1983 | Schwartzman . | |
| 5,327,725 | 7/1994 | Mitsubori | 60/605.2 |

FOREIGN PATENT DOCUMENTS

| | | |
|---|---|---|
| 2541156 | 3/1977 | Germany . |
| 1510070 | 5/1978 | Germany . |
| 2901041 | 7/1980 | Germany . |
| 2039610 | 8/1980 | Germany . |
| 3019607 | 11/1980 | Germany . |
| 3128040 | 2/1983 | Germany . |
| 3225867 | 1/1984 | Germany ............ 60/605.2 |
| 2136058 | 9/1984 | Germany . |
| 3504465 | 1/1986 | Germany . |
| 231639 | 7/1944 | Switzerland ............ 60/606 |

Primary Examiner—Michael Koczo
Attorney, Agent, or Firm—Klaus J. Bach

[57] ABSTRACT

An exhaust gas turbocharger for a supercharged internal combustion engine, in which the exhaust gas turbocharger includes at least one turbine and at least one compressor and the turbine has a turbine casing with a spiral-shaped flow guide duct, a turbine wheel, an inlet end and an outlet end and the compressor includes a compressor casing with a diffuser duct, an impeller, a pressure side and a suction side and the turbine wheel and the compressor impeller are mounted on a common shaft and the turbine casing and the compressor casing, together with a bearing housing, an exhaust gas turbocharger casing and define a gas conduit connection between the inlet end of the turbine and the pressure side of the compressor with at least one control valve and a gas delivery device arranged in the gas conduit connection for controlling the flow of gas between the inlet end of the turbine and the pressure side of the compressor.

4 Claims, 6 Drawing Sheets

5,406,796

EXHAUST GAS TURBOCHARGER FOR A SUPERCHARGED INTERNAL COMBUSTION ENGINE

BACKGROUND OF THE INVENTION

The invention relates to an exhaust gas turbocharger for an internal combustion engine with an exhaust gas recycling or a boost air supply for the internal combustion engine.

An exhaust gas turbocharger for a supercharged internal combustion engine of this type is known from German Offenlegungsschrift 29 01 041. This turbocharger has a turbine and a compressor with an annular chamber which has a flow connection to the spiral duct of the turbine formed in the turbine housing in the region of the peripheral edge on the backside of the turbine wheel. A connecting conduit extends from the annular chamber to a boost air conduit leading from the pressure side of the compressor to the inlet end of the internal combustion engine with a control valve arranged in the connecting conduit.

For general background, reference is also made to the following publications: German Offenlegungsschrift 25 41 156, German Patent Specification 30 19 607, German Offenlegungsschrift 31 28 040, German Patent Specification 35 04 465 and U.S. Pat. No. 4,367,626.

It is the object of the invention to provide an exhaust gas turbocharger which is simple in design and cost efficient whereby exhaust gas recycling can be effected even when very low exhaust gas pressures are present at the inlet end of the turbine.

SUMMARY OF THE INVENTION

An exhaust gas turbocharger for a supercharged internal combustion engine, in which the exhaust gas turbocharger includes at least one turbine and at least one compressor and the turbine has a turbine casing with a spiral-shaped flow guide duct, a turbine wheel, an inlet end and an outlet end and the compressor includes a compressor casing with a diffuser duct, an impeller, a pressure side and a suction side and the turbine wheel and the compressor impeller are mounted on a common shaft and the turbine casing and the compressor casing, together with a bearing housing, term an exhaust gas turbocharger casing and define a gas conduit connection between the inlet end of the turbine and the pressure side of the compressor with at least one control valve and a gas delivery device arranged in the gas conduit connection for controlling the flow of gas between the inlet end of the turbine and the pressure side of the compressor.

An advantage of the arrangement of the exhaust gas turbocharger according to the invention lies in the tact that, due to the gas delivery device present, it is no longer a functional necessity top the exhaust gas pressure at the inlet end of the turbine to be higher than the boost air pressure in the boost air conduit when exhaust gas recycling is desired.

An arrangement with a control valve controlled as a function of engine and turbine operating parameters is a preferred embodiment because of its simplicity and high flexibility.

A particularly compact arrangement of the exhaust gas turbocharger according to the invention achieved by a configuration, wherein a second compressor is arranged on the backside of the impeller of the first compressor or on the backside of the turbine wheel.

It is also advantageous if the exhaust gas turbine or the exhaust gas turbocharger and the gas delivery device are configured as an exhaust gas compressor mounted directly adjacent to one another on the shaft the exhaust gas turbocharger, whereby the hot gas end is separated from the boost air end of the exhaust gas turbocharger.

In an advantageous configuration of the invention the gas delivery device is used as a boost air pump, whereby boost air from the pressure side of the compressor is delivered into the exhaust gas conduit of the internal combustion engine, for example, for an air supply necessary for stoichiometric reasons for a catalyzer.

In another advantageous configuration of the invention optional operation of the gas delivery device as an exhaust gas pump or as a boost air pump is possible, depending on the operating conditions of the engine.

In still another embodiment the gas delivery device includes an annular chamber with a perforated wall arranged adjacent the circumferential edge of the impeller whereby the relatively low static pressure level of the boost air immediately downstream of the pressure-side compressor impeller periphery is utilized.

Further configurations and advantages of the invention are apparent from the description.

DESCRIPTION OF THE PREFERRED EMBODIMENTS

Figure 1:
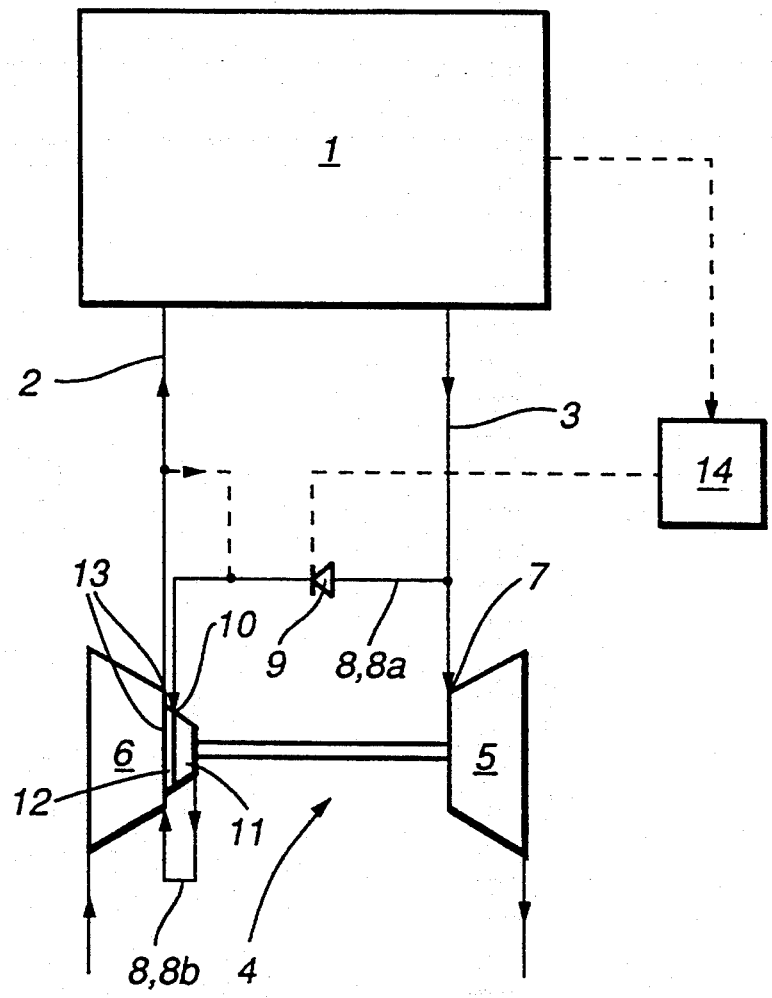
FIG. 1 is a schematic representation of a supercharged internal combustion engine with an exhaust gas turbocharger in accordance with the invention including an exhaust gas compressor.

FIG. 1 shows, in a schematic representation, a supercharged internal combustion engine 1 which is connected, via a boost air conduit 2 and via an exhaust gas conduit 3, to an exhaust gas turbocharger 4 in a manner which is, in principle, known. The same reference symbols are used for the same components in FIGS. 1 to 6.

The exhaust gas turbocharger 4 has a turbine 5 and a compressor 6, a first part 8a of a gas conduit connection 8 with a control valve 9 leading from the inlet end 7 of the turbine 5 to the suction side 10 of an exhaust gas compressor 11 (second compressor).

The exhaust gas compressor 11 is located on the shaft next to the air compressor 6 and a diffuser duct 12 of the exhaust gas compressor 11 opens into a collecting duct 13 of the air compressor 6. The flow connection between the suction side 10 or the exhaust gas compressor 11 and the collecting duct 13 or the air compressor 6 simultaneously forms the second part 8b or the gas conduit connection 8 between the inlet end 7 or the turbine 5 and the pressure side 34 of the air compressor 6.

The control valve 9 is controlled by means or a control unit 14 as a function or operating parameters or the internal combustion engine 1 and the exhaust gas turbocharger 4.

Figure 2:
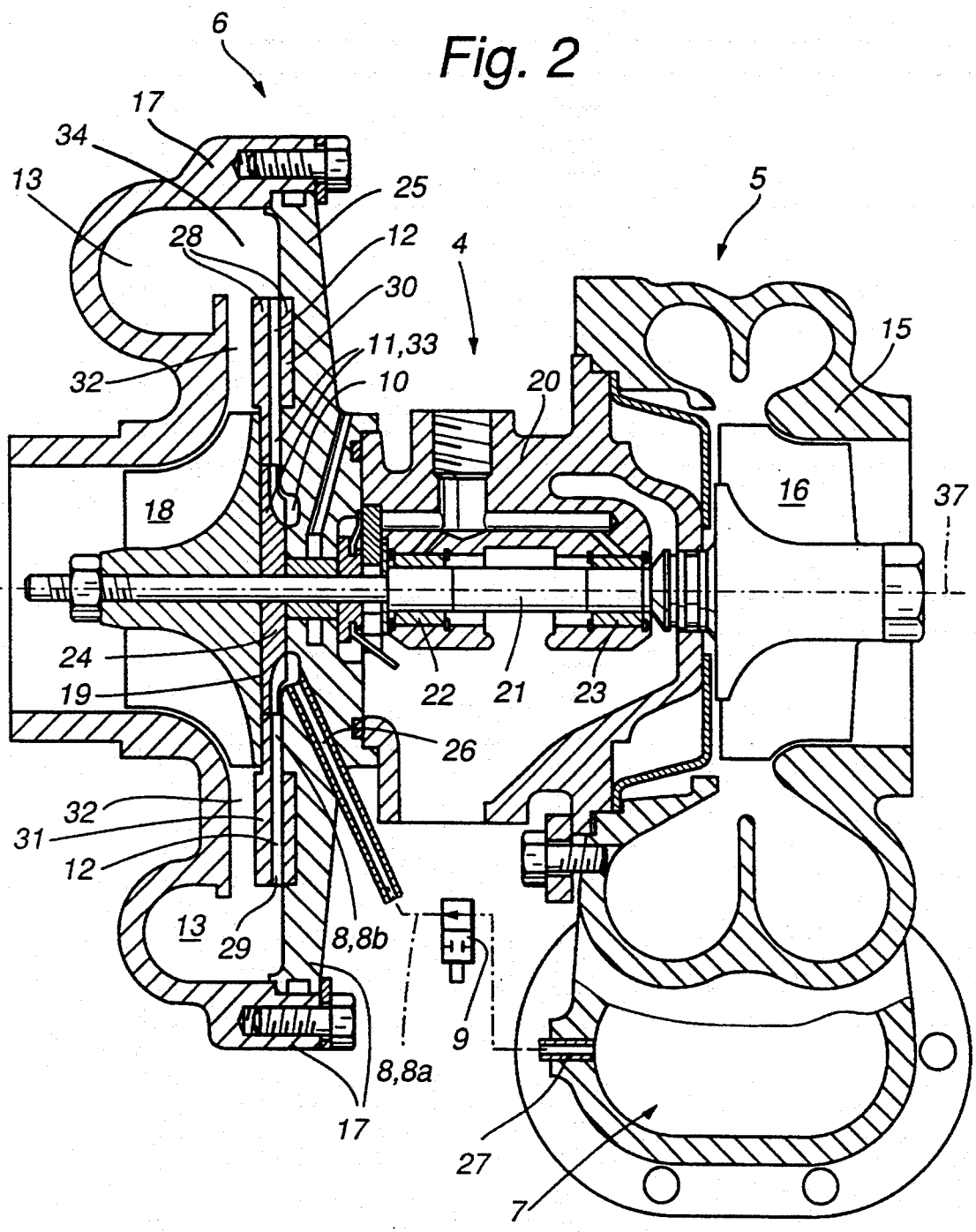
FIG. 2 shows a design configuration of the exhaust gas turbocharger and exhaust gas compressor FIG. 1, the exhaust gas compressor being arranged on the back of the impeller of the compressor of the exhaust gas turbocharger and the suction side of the exhaust gas compressor being connected via a gas conduit connection to the inlet end of a turbine of the exhaust gas turbocharger.

FIG. 2 shows a design configuration of the exhaust gas turbocharger 4 of FIG. 1. The turbine 5 includes a turbine casing 15 and a turbine wheel 16 and the air compressor 6 includes a compressor casing 17 and an impeller 18 with impeller backside 19. The turbine casing 15 and the compressor casing 17 are flanged onto a bearing housing 20 of the exhaust gas turbocharger 4. The turbine wheel 16 and the compressor impeller 18 are mounted on a common shaft 21 with a shaft center line 37, the shaft 21 being supported by bearings 22 and 23.

An impeller 24 of the exhaust gas compressor 11, which forms a gas delivery device 33, is firmly connected to the shaft 21 at the backside 19 or the compressor impeller.

A passage 26 extends through a compressor casing part 25, racing the bearing housing 20, or the split compressor casing 17 to the suction side 10 of the exhaust gas compressor 11. The outer end of the passage 26 is in communication with the first part 8a of the gas conduit connection 8, which includes a control valve 9 and which is in communication with the inlet end 7 of the turbine 5 via a passage 27.

The diffuser duct 12 of the exhaust gas compressor 11 opens directly into the collecting duct 13 (pressure side 34) of the air compressor 6. A guide vane ring 28 with guide vanes 29 and guide vane ring parts 30 and 31 is arranged in the diffuser duct 12 or the exhaust gas compressor 11. The guide vane ring part 30 is firmly connected to the compressor casing part 25. The guide vane ring part 31 is supported by the guide vanes 29 and forms a wall of a diffuser duct 32 of the air compressor 6 ahead of the latter's collecting duct 13.

Figure 3:
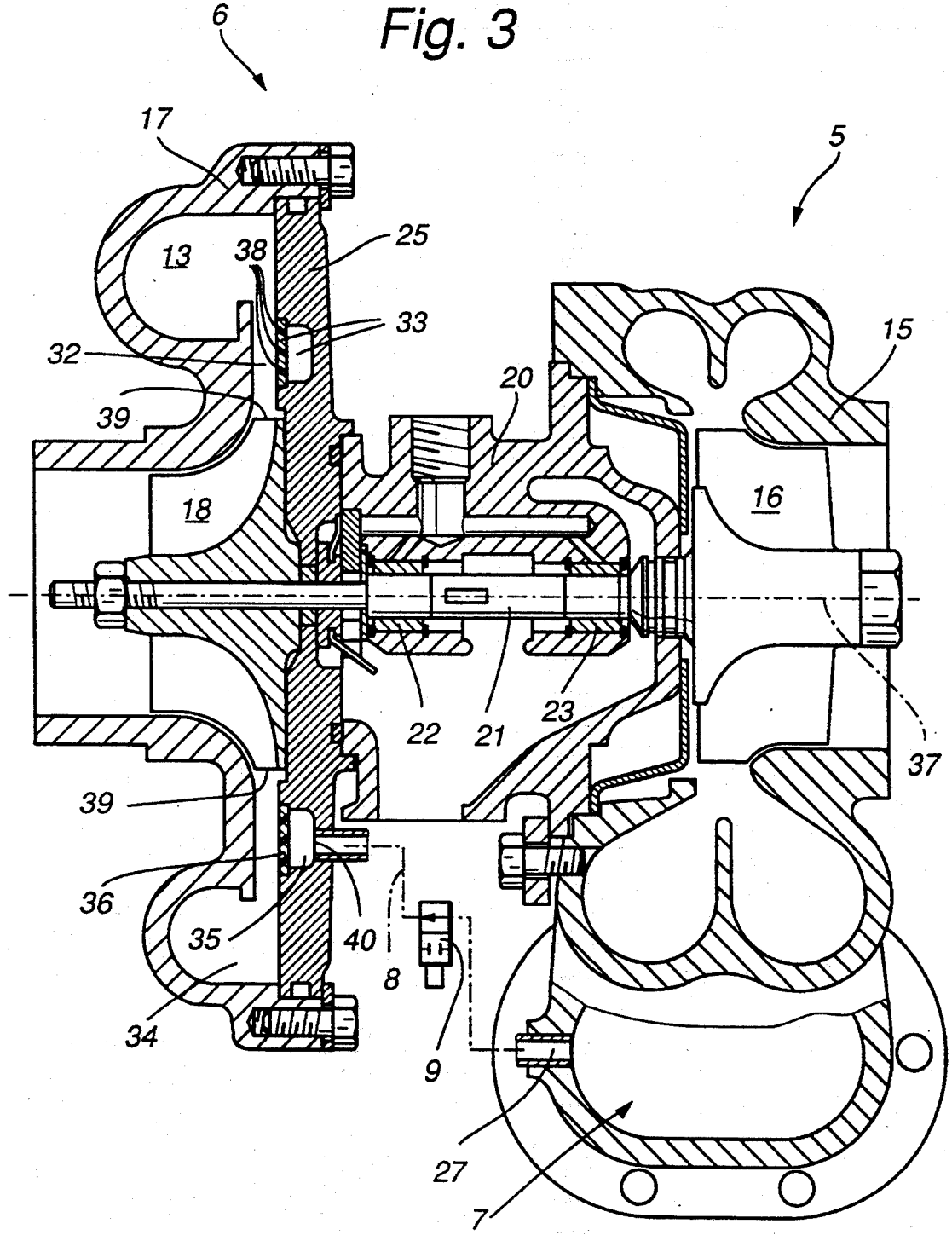
FIG. 3 shows a design configuration of the gas delivery device, which includes an annular chamber with a perforated wall, the annular chamber being connected to the inlet end of a turbine via the gas conduit connection and having openings at the pressure-side periphery of the impeller of the compressor of the exhaust gas turbocharger.

A further configuration of the gas delivery device 33 is shown in FIG. 3. An annular chamber 35 with a perforated wall 36 is arranged in the compressor casing part 25. Holes 38 are formed in the perforated wall 36 distributed around the periphery and these holes extend obliquely outwardly relative to the axial direction of the shaft center line 37. Exhaust gas can be blown through the holes 38 into the diffuser duct 32 of the air compressor 6, which duct 32 is disposed downstream adjacent the pressure-side compressor impeller periphery 39.

An opening 40, to which the gas conduit 8 is connected, is located in the annular chamber 35. This gas conduit 8 is, in a manner analogous to FIG. 2, connected to the inlet end 7 of the turbine 5.

Part of the conversion of the kinetic energy of the boost air at the suction side into static pressure energy on the pressure side 34 of the air compressor 6 takes place, as is known, in the compressor impeller 16, which can be regarded as a rotating diffuser, and part takes place in the diffuser duct 32, with a small part taking place in the spiral-shaped collecting duct which is determined by the so-called rate of reaction.

When compressors with a relatively low rate of reaction are used, for example, a rate of reaction of 0.5, only half the kinetic energy of the boost air is converted into static pressure energy at the compressor impeller periphery 39. It the flow velocity of the boost air is relatively high, its static pressure in the diffuser duct 32, immediately after the compressor impeller periphery 39, is only slightly higher than it is directly at the compressor impeller periphery 39. Because of this relatively low static pressure, there is a pressure drop in most cases from the inlet end 7 of the turbine 5 to the pressure-side compressor impeller periphery 39 so that exhaust gas from the inlet end 7 of the turbine 5 flows to the diffuser duct 32 of the air compressor 6 via the gas conduit connection 8, the annular chamber 35 and the holes 38.

Figure 4:
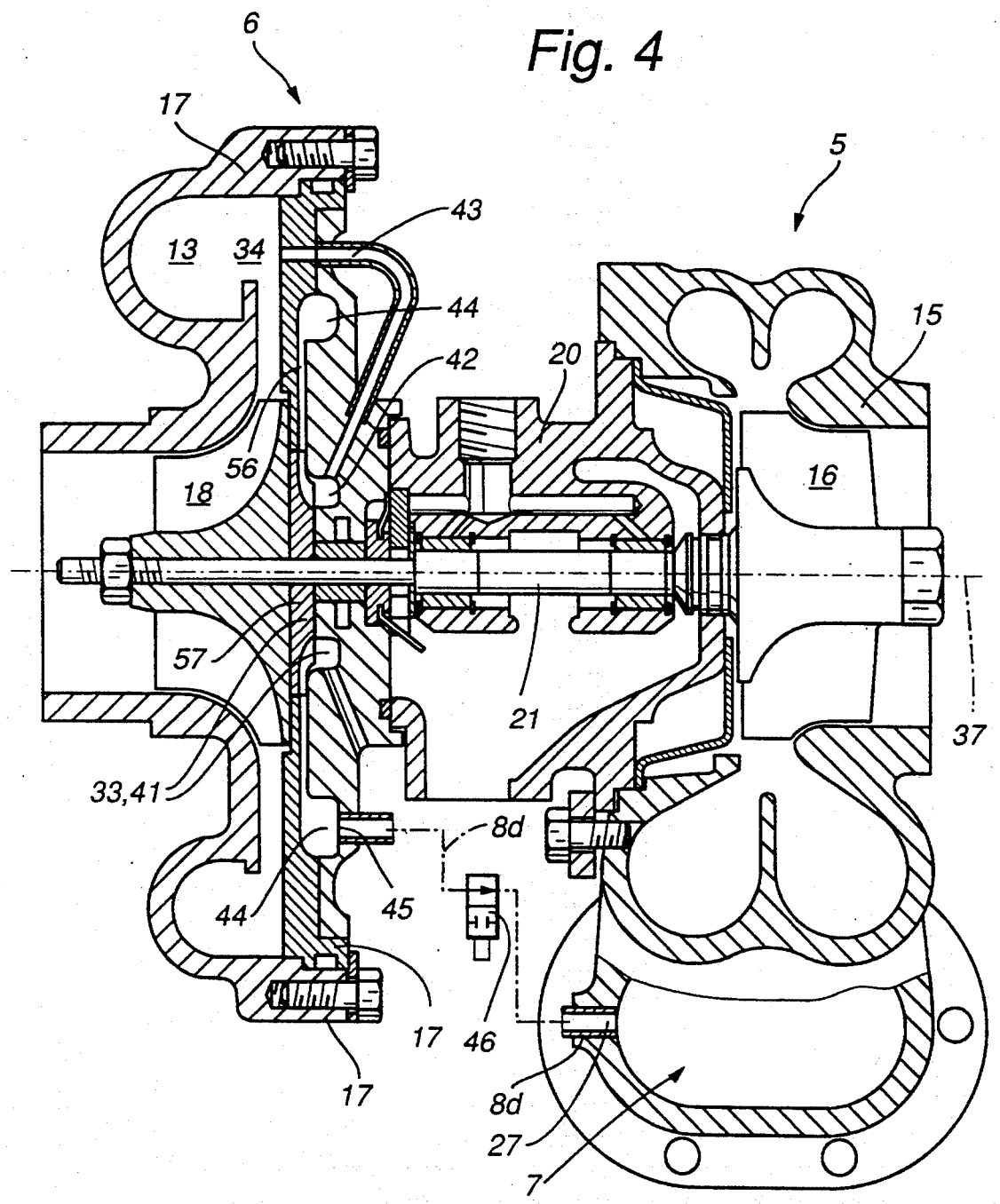
FIG. 4 shows a configuration of the invention with a second compressor which is embodied as a boost air pump and by which boost air can be delivered into the exhaust gas conduit.

An embodiment of the invention with a second compressor 41 utilized as a boost air pump is shown in FIG. 4.

At its suction side 42, the second compressor 41 is connected to a connecting conduit 43 which is in communication with the collecting duct 13 (pressure side 34) of the air compressor 6. A collecting duct 44 of the second compressor 41 has an outlet opening 45 which opens into a gas conduit connecting part 8d of the gas conduit connection 8, which is connected to the opening 27 of the inlet end 7 of the turbine 5. A diffuser duct 56 extends tom the collecting duct 44 to the compressor impeller 57 of the second compressor 41. In the connecting conduit 8d, there is a control valve 46 which can be controlled as a function of operating parameters of the internal combustion engine 1 and the exhaust gas turbocharger 4.

On the basis of FIG. 4, a conduit (not shown) may extend from the gas conduit connecting part 8d to the suction side 42 of the compressor 41 and a further conduit may extend from the collecting duct 44 to the collecting duct 13 of the air compressor 6, a control valve which can be controlled by operating parameters of the internal combustion engine 1 being arranged in each of the two conduits. This arrangement permits the compressor 41 to be optionally used as a gas delivery device 33 supplying boost air into the exhaust gas conduit 3 or supplying exhaust gas to the boost air conduit 2 (FIG. 1). An advantageous effect of supplying boost air into the exhaust gas conduit 3 occurs, for example, when air needs to be supplied, for stoichiometric reasons, to a catalyzer located in the exhaust gas conduit.

Figure 5:
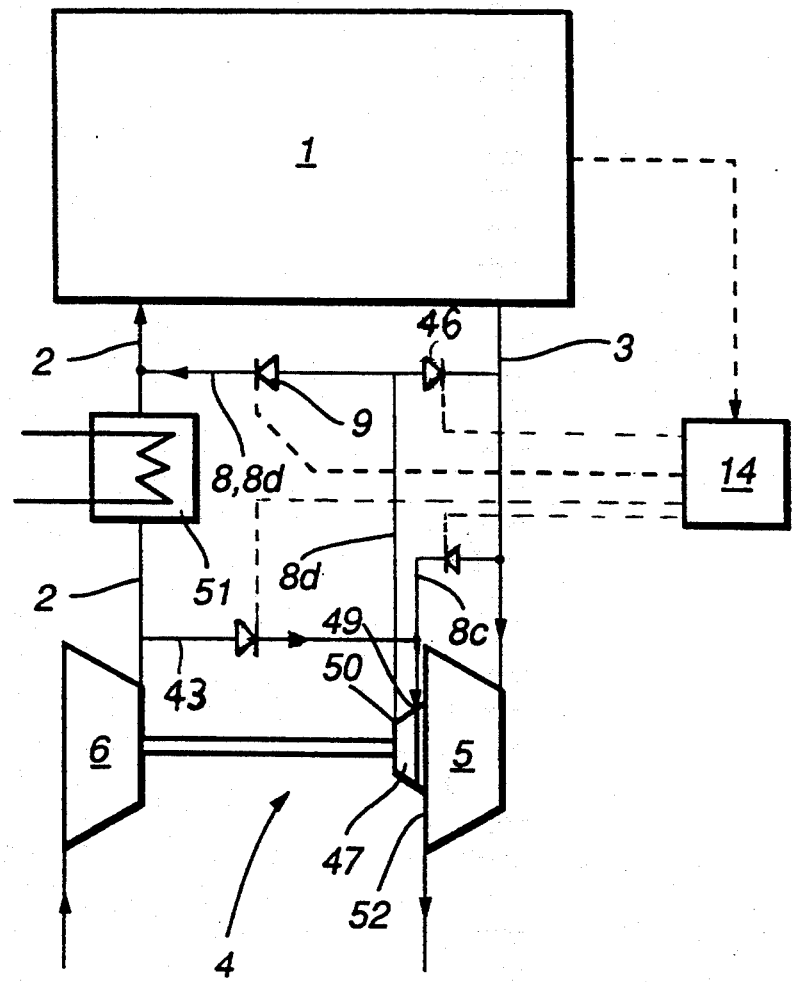
FIG. 5 is a schematic representation of a further configuration of the invention with an exhaust gas compressor which is arranged at the turbine end of the exhaust gas turbocharger and by which exhaust gas is recycled into the boost air conduit.

FIG. 5 is a diagrammatic representation of a further embodiment of the invention including an exhaust gas compressor 47, arranged on the backside 52 of a turbine wheel of the turbine 5 of the exhaust gas turbocharger 4, whereby exhaust gas can be recycled into the boost air conduit 2. Like in the arrangement of FIG. 4, the exhaust gas compressor 47 has an impeller 48, a suction side 49 and a pressure-side collecting duct 50.

A gas conduit connecting part 8c, which is connected to the suction side 49 of the exhaust gas compressor 47, branches of from the exhaust gas conduit 3. The gas conduit connecting part 8d leads from the collecting duct 50 to the boost air conduit 2, preferably downstream of an air intercooler 51 arranged in the boost air conduit 2.

As also shown in FIG. 5 a conduit connection with valve 46 permits the supply of compressed air through line 43 and the second compressor 47 to the inlet of the turbine 5.

Figure 6:
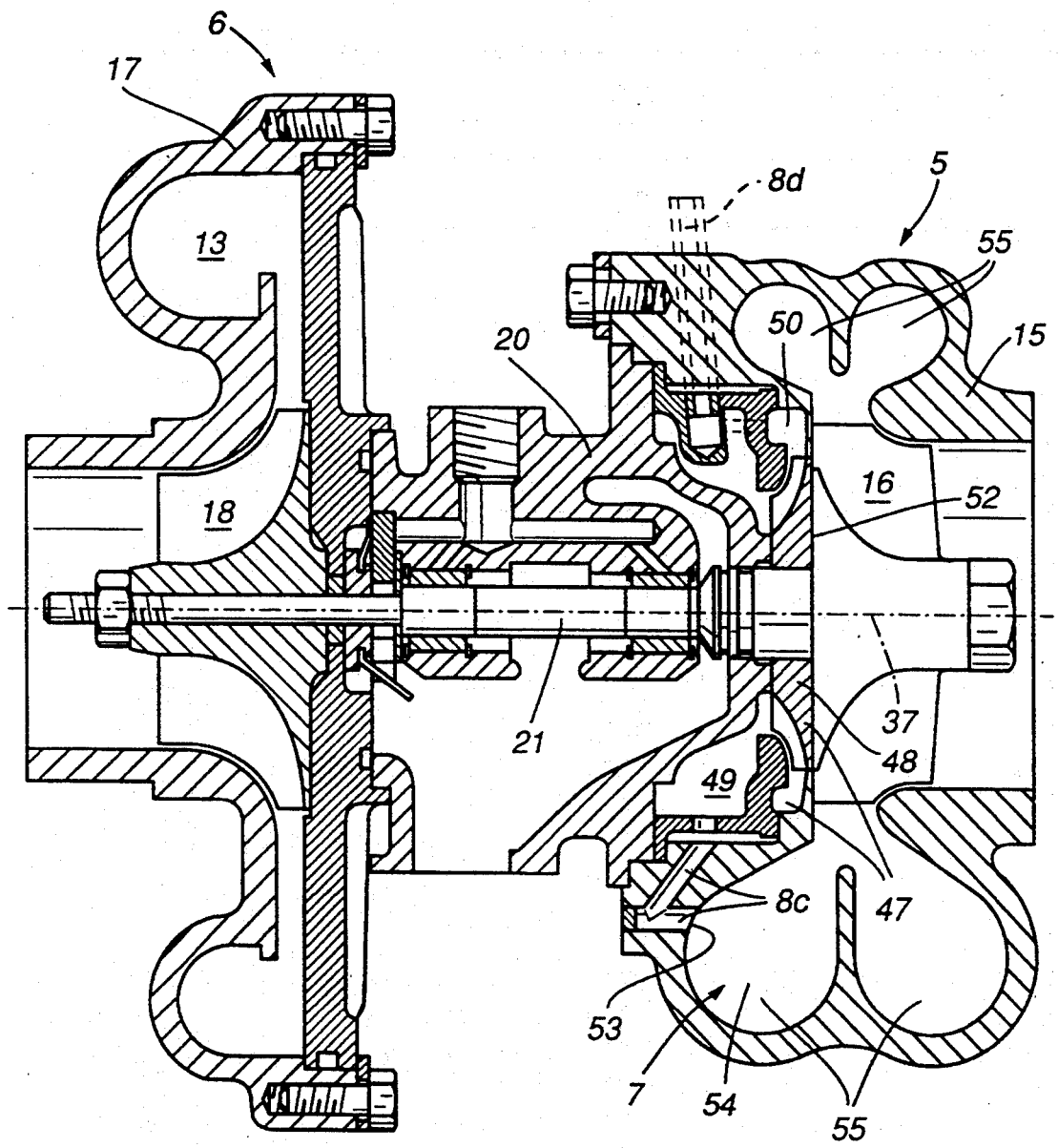
FIG. 6 shows a design configuration of the arrangement of the exhaust gas turbocharger and exhaust gas compressor of FIG. 5.

FIG. 6 shows a design configuration of the exhaust gas turbocharger 4 according to the schematic representation of FIG. 5.

The exhaust gas compressor 47 is arranged on the backside 52 of the turbine wheel 16. The compressor impeller 48 is firmly connected to the shaft 21. The gas conduit connecting part 8c extends from an opening which is arranged in a spiral duct part 54, adjoining the inlet end 7, of a spiral duct 55 of the turbine 5, to the suction side 49 of the exhaust gas compressor 47. The collecting duct 50 is in communication with the gas conduit connecting part 8d which, as shown in FIG. 5, leads to the boost air conduit 2.

What is claimed is:

1. An exhaust gas turbocharger for a supercharged internal combustion engine with exhaust gas recycling, said exhaust gas turbocharger including at least an exhaust gas turbine with a turbine wheel and having a turbine inlet for receiving the exhaust gas from said engine and a turbine outlet and a main air compressor with an impeller and having a suction side and a pressure side connected to said engine for supplying compressed air thereto, said turbine and said main air compressor being mounted on a common shaft, a second compressor mounted for rotation with said common shaft and having a compressor inlet and a compressor outlet, a connecting line extending between the pressure side of said main air compressor and the inlet of said second compressor, a connecting line extending between the outlet of said second compressor and the turbine inlet, a connecting line extending between the inlet of said turbine and the inlet side of said second compressor, a connecting line extending between the outlet of said second compressor and the pressure side of said main air compressor, control valves arranged in said connecting lines, and means connected to said control valves for controlling said valves for selectively supplying compressed air to the inlet side of said turbine or exhaust gas to the pressure side of said main air compressor through said second compressor.

2. An exhaust gas turbocharger according to claim 1, wherein said control valves are controllable by a control unit as a function of operating parameters of the internal combustion engine and the exhaust gas turbocharger.

3. An exhaust gas turbocharger according to claim 1, wherein said second compressor is arranged on a back of the impeller of sa id first compressor.

4. An exhaust gas turbocharger according to claim 1, wherein said second compressor is arranged on the back of said turbine wheel.

* * * * *